(12) United States Patent
Sakamoto et al.

(10) Patent No.: US 7,766,237 B2
(45) Date of Patent: Aug. 3, 2010

(54) MOBILE RADIO COMMUNICATION APPARATUS

(75) Inventors: Kazuyuki Sakamoto, Chiba (JP); Kunihide Fujii, Tokyo (JP)

(73) Assignee: Sony Corporation, Tokyo (JP)

( * ) Notice: Subject to any disclaimer, the term of this patent is extended or adjusted under 35 U.S.C. 154(b) by 1149 days.

(21) Appl. No.: 10/575,363

(22) PCT Filed: Oct. 22, 2004

(86) PCT No.: PCT/JP2004/016067

§ 371 (c)(1),
(2), (4) Date: Apr. 11, 2006

(87) PCT Pub. No.: WO2005/041119

PCT Pub. Date: May 6, 2005

(65) Prior Publication Data

US 2007/0026893 A1    Feb. 1, 2007

(30) Foreign Application Priority Data

Oct. 23, 2003    (JP) .............................. 2003-363009

(51) Int. Cl.
*G06K 7/08* (2006.01)
(52) U.S. Cl. ...................... 235/451; 235/492
(58) Field of Classification Search ................. 235/451, 235/487, 492, 382; 455/422, 425, 426
See application file for complete search history.

(56) References Cited

U.S. PATENT DOCUMENTS

| | | | |
|---|---|---|---|
| 5,889,273 A * | 3/1999 | Goto ........................... | 235/492 |
| 6,021,951 A * | 2/2000 | Nishikawa ................... | 235/494 |
| 6,536,673 B1 | 3/2003 | Kawasaki et al. | |
| 6,831,548 B1 | 12/2004 | Eber et al. | |
| 2004/0026517 A1 | 2/2004 | Moller et al. | |
| 2004/0042604 A1 | 3/2004 | Hiltunen et al. | |
| 2005/0117566 A1 * | 6/2005 | Davidson .................... | 370/352 |

(Continued)

FOREIGN PATENT DOCUMENTS

JP    9-83585    3/1997

(Continued)

*Primary Examiner*—Daniel St. Cyr
(74) *Attorney, Agent, or Firm*—Oblon, Spivak, McClelland, Maier & Neustadt, L.L.P.

(57) ABSTRACT

A mobile radio communication device can automatically initialize the mode of a SAM card (or the SAM function area of an IC card) after executing radio communication with an external radio communication apparatus. The mobile radio communication device transmits/receives data to/from an external radio communication apparatus located in an area that allows radio communication. In the mobile radio communication device, an IC card that receives power supply from a mobile radio communication device main-unit, that manages data transmitted/received to/from the external radio communication apparatus, and that manages a communication mode state of the mobile radio communication device is detachably connected to the mobile radio communication device main-unit. The mobile radio communication device further includes radio-signal strength determining means for determining whether or not a strength of radio signals received from the external radio communication apparatus is less than or equal to a preset threshold value, and IC-card-mode initializing means for resetting a mode of the IC card to an initial state when the radio-signal strength determining means determines that the strength of the radio signals is less than or equal to the threshold value.

19 Claims, 9 Drawing Sheets

U.S. PATENT DOCUMENTS

| | | | |
|---|---|---|---|
| 2005/0176427 A1* | 8/2005 | Roberts | 455/434 |
| 2006/0079223 A1* | 4/2006 | Trinkel et al. | 455/426.1 |
| 2006/0105810 A1* | 5/2006 | Gnuschke | 455/558 |

FOREIGN PATENT DOCUMENTS

| | | |
|---|---|---|
| JP | 9-130999 | 5/1997 |
| JP | 2000-148961 | 5/2000 |
| JP | 2000-242742 | 9/2000 |
| JP | 2001-22902 | 1/2001 |
| JP | 2001-43327 | 2/2001 |
| JP | 2001-250089 | 9/2001 |
| JP | 2002-175502 | 6/2002 |
| JP | 2002-523945 | 7/2002 |
| JP | 2003-36427 | 2/2003 |
| JP | 2003-141429 | 5/2003 |
| JP | 2003-187167 | 7/2003 |
| JP | 2003-203212 | 7/2003 |
| JP | 2004-508780 | 3/2004 |
| JP | 2005-521928 | 7/2005 |
| WO | 02/21867 | 3/2002 |

* cited by examiner

MOBILE RADIO COMMUNICATION APPARATUS

TECHNICAL FIELD

The present invention relates to mobile radio communication devices, and more specifically, to a mobile radio communication device and so on equipped with an NFC (near field communication) function.

Background Art

In recent years, contactless IC cards that can execute communication without physical contact with an IC card reader/writer have been put to practical use. In addition, for example, a technology in which such a contactless IC card is incorporated into a portable lightweight terminal device to communicate with an IC card reader/writer has been proposed (refer to Japanese Unexamined Patent Application Publication No. 2002-345037). In Japanese Unexamined Patent Application Publication No. 2002-345037, holding the card portion of a mobile phone having a contactless IC card to an IC card R/W (IC card reader/writer) causes communication (encrypted communication) of secret information stored in the contactless IC card to be executed over electromagnetic waves from the IC card reader/writer. The communication of the contactless IC card utilizes electromagnetic waves of the IC card reader writer, so that, when the contactless IC card is away from the IC card reader/writer by a predetermined distance, power is not supplied to the contactless IC card to thereby initialize the mode of the IC card. This allows the IC card to execute communication with another IC card reader/writer. With regard to the IC card, the mode state (e.g., the initial state, authentication state, and communication state) of the IC card is managed by, for example, a RAM or the like in the IC card. Thus, turning off the power supply for the IC card or resetting the mode state (e.g., the communication state) of the IC card causes the IC card to be put into its initial mode. When the IC card is in a mode state other than the initial mode, the IC card cannot execute communication with another communication apparatus, and only after the IC card is put into the initial mode, the IC card can execute communication with another communication apparatus.

On the other hand, a near-field radio communication technology (NFC: "Near Field Communication", a near-filed radio communication standard internationally standardized as ISO/IEC IS 18092 in December 2003) in which communication is expanded up to inter-device communication using a communication protocol between the contactless IC card and the IC card reader/writer is bringing attention. That is, in the NFC technology, an NFC function (including an NFC antenna, an NFC circuit, and a SAM card) is incorporated into mobile phones, digital cameras, PDAs (personal digital assistants), personal computers, game machines, and computer peripheral apparatuses to allow communication of any types of data, as far as the NFC-equipped apparatuses are in a near-distance range of, for example, 20 cm or less. Such NFC-equipped apparatuses can also serve as readers for contactless IC cards. In addition, incorporating SAM (secure application module) cards into such NFC-equipped apparatuses allow them to serve as contactless IC cards.

Additionally, the communication area in the above-described NFC technology is small compared to that of radio communication devices based on Blue Tooth and wireless LAN technologies. Thus, the NFC technology receives attention in that it is not only superior in terms of the security but also has a property different from the known communication technology in which NFC-equipped apparatuses automatically communicate with each other when they come close to each other to a predetermined range. In the NFC technology, data exchange can be performed at a speed (e.g., up to 424 kbps) that allows transmission of high-quality images.

As described above, the incorporation of the NFC function into radio communication mobile terminals, such as mobile phones and PDAs, can provide communication means that can access network content for payment using credit cards and so on, tickets, and games through a simple operation, i.e., only bringing the NFC-equipped apparatus close. It is expected for content and service providers to provide users with new means for accessing various types of services.

However, when there is a need to securely store data (e.g., electronic money), the NFC-equipped apparatus terminal needs to be equipped with a SAM card requiring power supply, unlike the contactless-IC-card-equipped apparatus terminal disclosed in Japanese Unexamined Patent Application Publication No. 2002-345037. In such a case, when the NFC-equipped apparatus terminal executes communication with an external NFC-equipped apparatus, the mode of the SAM card (or a SAM function area of the IC card) is put into a communication state but power is continuously supplied to the SAM card (or the SAM function area of the IC card). Thus, even when the NFC-equipped terminal is away from the NFC-equipped apparatus by a predetermined distance to thereby terminate the communication, the communication mode state of the SAM card (or the SAM function area of the IC card) is continuously maintained. As a result, the mode of the SAM card (or the SAM function area of the IC card) of the NFC-equipped apparatus terminal cannot be automatically put into the initial state, thus providing a problem in that it cannot execute communication with another NFC-equipped apparatus.

In addition, for example, when the NFC function is incorporated into a mobile phone, it is preferable, in terms of practical use including the miniaturization and simplification of the radio communication apparatus terminal, that the SAM card and the SIM card are integrated into one IC card, since a typical mobile phone has a SIM (subscriber identity module) or UIM (user identity module) in which various types of information, such as telephone numbers and information of registration with a communication carrier, are written. In this case, since power supply for the SIM function area cannot be turned off, there is a need for a technology for resetting only the SAM function area without turning off power supply for the IC card.

Accordingly, an object of the present invention is to provide a novel and improved mobile radio communication device that allows the mode of a SAM card (or the SAM function area of an IC card) to be automatically initialized after executing radio communication with an external radio communication apparatus.

DISCLOSURE OF INVENTION

To solve the problem described above, a first aspect of the present invention provides a mobile radio communication device for transmitting/receiving data to/from an external radio communication apparatus located in an area that allows radio communication. The mobile radio communication device includes: a radio-signal transmitting/receiving unit for performing radio communication with the external radio communication apparatus; and a connection unit detachably connected to an IC card that receives power supply from the mobile radio communication device, that manages data transmitted/received to/from the external radio communication apparatus, and that manages a communication mode state of the mobile radio communication device. The mobile radio communication device further includes: radio-signal strength determining means for determining whether or not a strength of radio signals received from the external radio communication apparatus is less than or equal to a preset threshold value; and IC-card-mode initializing means for resetting a mode of the IC card to an initial state when the radio-signal strength determining means determines that the strength of the received radio signals is less than or equal to the threshold value.

According to the above-described aspect of the present invention, for example, in a mobile radio communication device in which an NFC IC card (e.g., a SAM card) is connected to a mobile terminal, including a mobile phone having an IC card such as a SIM card, USIM card, or a flash memory card, the mode of the IC card is automatically initialized after radio communication (NFC communication) with another NFC-equipped apparatus is executed. Thus, even when the IC card of the mobile radio communication device is maintained in another mode (e.g., a communication mode) after completion of communication, the IC card is automatically reset to the initial state. Thus, the mobile radio communication device can be automatically put into a state that allows communication with another NFC-equipped apparatus. In addition, it is possible to maintain compatibility with currently-available contactless IC card systems.

When the mobile radio communication device is configured to further have radio strength threshold-value setting means for performing setting in accordance with a predetermined condition, preferable threshold value can be set in accordance with various radio communication conditions between the mobile radio communication device and another external radio communication apparatus.

The mobile radio communication device may further have data transmission stopping means for stopping transmission of data to the IC card, when the radio-signal strength determining means determines that the strength of the received radio signals is less than or equal to the threshold value. With this arrangement, for example, data generated by noise or the like is prevented from being transmitted to the IC card.

The mobile radio communication device can be incorporated into a mobile telephone terminal.

The IC card may be configured such that it is integrated with a SIM card detachably connected with the mobile telephone terminal and is provided. With this arrangement, even when a new mobile phone equipped with the NFC function is purchased, user information regarding the NFC function and user information stored in a mobile phone can be easily transferred and replaced.

To solve the problem described above, a second aspect of the present invention provides a mobile radio communication device for transmitting/receiving data to/from an external radio communication apparatus located in an area that allows radio communication. The mobile radio communication device includes: a radio-signal transmitting/receiving unit for performing radio communication with the external radio communication apparatus; and a connection unit detachably connected to an IC card that receives power supply from the mobile radio communication device, that manages data transmitted/received to/from the external radio communication apparatus, and that manages a communication mode state of the mobile radio communication device. The mobile radio communication device further includes: radio-signal strength determining means for determining whether or not a strength of radio signals received from the external radio communication apparatus is less than or equal to a preset threshold value; and clock-signal controlling means for stopping supply of a clock signal to the IC card when the radio-signal strength determining means determines that the strength of the received radio signals is less than or equal to the threshold value. The IC card includes mode initializing means for putting a mode of the IC card into an initial state when the supply of the clock signal is stopped.

According to the above-described aspect of the present invention, for example, in a mobile radio communication device in which an NFC IC card (e.g., a SAM card) is connected to a mobile terminal, including a mobile phone having an IC card such as a SIM card, USIM card, or a flash memory card, the mode of the IC card is automatically initialized after radio communication (NFC communication) with another NFC-equipped apparatus is executed. Thus, even when the IC card of the mobile radio communication device is maintained in another mode (e.g., a communication mode) after completion of communication, the IC card is automatically reset into the initial state. Thus, the mobile radio communication device can be automatically put into a state that allows communication with another NFC-equipped apparatus. In addition, it is possible to maintain compatibility with currently-available contactless IC card systems. Additionally, since the IC card can be reset using a line through which general data communication is performed, it is possible to easily manufacture mobile radio communication devices at low cost.

When the mobile radio communication device is configured to further have radio strength threshold-value setting means for performing setting in accordance with a predetermined condition, preferable threshold value can be set in accordance with various radio communication conditions between the mobile radio communication device and another external radio communication apparatus.

The mobile radio communication device further has data transmission stopping means for stopping transmission of data to the IC card, when the radio-signal strength determining means determines that the strength of the received radio signals is less than or equal to the threshold value. With this arrangement, for example, data generated by noise or the like is prevented from being transmitted to the IC card.

The mobile radio communication device can be incorporated into a mobile telephone terminal.

The IC card may be configured such that it is integrated with a SIM card detachably connected with the mobile telephone terminal and is provided. With this arrangement, even when a new mobile phone equipped with the NFC function is purchased, user information regarding the NFC function and user information stored in a mobile phone can be easily transferred and replaced.

To solve the problem described above, a third aspect of the present invention provides a mobile radio communication device for transmitting/receiving data to/from an external radio communication apparatus located in an area that allows radio communication. The mobile radio communication device includes: a radio-signal transmitting/receiving unit for performing radio communication with the external radio communication apparatus; and a connection unit detachably connected to an IC card that receives power supply from the mobile radio communication device, that manages data transmitted/received to/from the external radio communication apparatus, and that manages a communication mode state of the mobile radio communication device. The mobile radio communication device further includes: radio-signal strength determining means for determining whether or not a strength of radio signals received from the external radio communication apparatus is less than or equal to a preset threshold value; and reset-signal generating means for transmitting a reset signal to the IC card when the radio-signal strength determining means determines that the strength of the received radio signals is less than or equal to the threshold value. The IC card includes mode initializing means for resetting a mode of the IC card to an initial state upon receiving the reset signal.

According to the above-described aspect of the present invention, for example, in a mobile radio communication device in which an NFC IC card (e.g., a SAM card) is connected to a mobile terminal, including a mobile phone having an IC card such as a SIM card, USIM card, or a flash memory card, the mode of the IC card is automatically initialized after radio communication (NFC communication) with another NFC-equipped apparatus is executed. Thus, even when the IC card of the mobile radio communication device is maintained in another mode (e.g., a communication mode) after completion of communication, the IC card is automatically reset to the initial state. Thus, the mobile radio communication device can be automatically put into a state that allows communication with another NFC-equipped apparatus. In addition, it is possible to maintain compatibility with currently-available contactless IC card systems. Additionally, since the IC card can be reset using a line through which general data communication is performed, it is possible to easily manufacture mobile radio communication devices at low cost.

When the mobile radio communication device is configured to further have radio strength threshold-value setting means for performing setting in accordance with a predetermined condition, preferable threshold value can be set in accordance with various radio communication conditions between the mobile radio communication device and another external radio communication apparatus.

The mobile radio communication device further has data transmission stopping means for stopping transmission of data to the IC card, when the radio-signal strength determining means determines that the strength of the received radio signals is less than or equal to the threshold value. With this arrangement, for example, data generated by noise or the like is prevented from being transmitted to the IC card.

The mobile radio communication device can be incorporated into a mobile telephone terminal.

The IC card may be configured such that it is integrated with a SIM card detachably connected with the mobile telephone terminal and is provided. With this arrangement, even when a new mobile phone equipped with the NFC function is purchased, user information regarding the NFC function and user information stored in a mobile phone can be easily transferred and replaced.

To solve the problem described above, a fourth aspect of the present invention provides a mobile radio communication device for transmitting/receiving data to/from an external radio communication apparatus located in an area that allows radio communication. The mobile radio communication device includes: a radio-signal transmitting/receiving unit for performing radio communication with the external radio communication apparatus; and a connection unit detachably connected to an IC card that receives power supply from the mobile radio communication device, that manages data transmitted/received to/from the external radio communication apparatus, and that manages a communication mode state of the mobile radio communication device. The mobile radio communication device further includes: radio-signal strength determining means for determining whether or not a strength of radio signals received from the external radio communication apparatus is less than or equal to a preset threshold value; power-supply stop instructing means for giving an instruction for stopping power supply to the IC card when the radio-signal strength determining means determines that the strength of the received radio signals is less than or equal to the threshold value; and power-supply stopping means for stopping the power supply from a power source to the IC card in accordance with the instruction given from the power-supply stop instructing means.

According to the above-described aspect of the present invention, for example, in a mobile radio communication device in which an NFC IC card (e.g., a SAM card) is connected to a mobile terminal, including a mobile phone having an IC card such as a SIM card, USIM card, or a flash memory card, the mode of the IC card is automatically initialized after radio communication (NFC communication) with another NFC-equipped apparatus is executed. Thus, even when the IC card of the mobile radio communication device is maintained in another mode (e.g., a communication mode) after completion of communication, the IC card is automatically reset to the initial state. Thus, the mobile radio communication device can be automatically put into a state that allows communication with another NFC-equipped apparatus. In addition, it is possible to maintain compatibility with currently-available contactless IC card systems.

When the mobile radio communication device is configured to further have radio strength threshold-value setting means for performing setting in accordance with a predetermined condition, preferable threshold value can be set in accordance with various radio communication conditions between the mobile radio communication device and another external radio communication apparatus.

The mobile radio communication device further has data transmission stopping means for stopping transmission of data to the IC card, when the radio-signal strength determining means determines that the strength of the received radio signals is less than or equal to the threshold value. With this arrangement, for example, data generated by noise or the like is prevented from being transmitted to the IC card.

The mobile radio communication device can be incorporated into a mobile telephone terminal.

The mobile radio communication device can be incorporated into a mobile phone terminal and the IC card can be provided separately from a SIM card that is detachably connected to the mobile phone terminal.

For example, in a mobile radio communication device in which an NFC IC card (e.g., a SAM card) is connected to a mobile terminal, including a mobile phone having an IC card such as a SIM card, USIM card, or a flash memory card, the mode of the IC card is automatically initialized after radio communication (NFC communication) with another NFC-equipped apparatus is executed. Thus, even when the IC card of the mobile radio communication device is maintained in another mode (e.g., a communication mode) after completion of communication, the IC card is automatically reset to the initial state. Thus, the mobile radio communication device can be automatically put into a state that allows communication with another NFC-equipped apparatus. In addition, it is possible to maintain compatibility with currently-available contactless IC card systems.

BEST MODE FOR CARRYING OUT THE INVENTION

Figure 1:
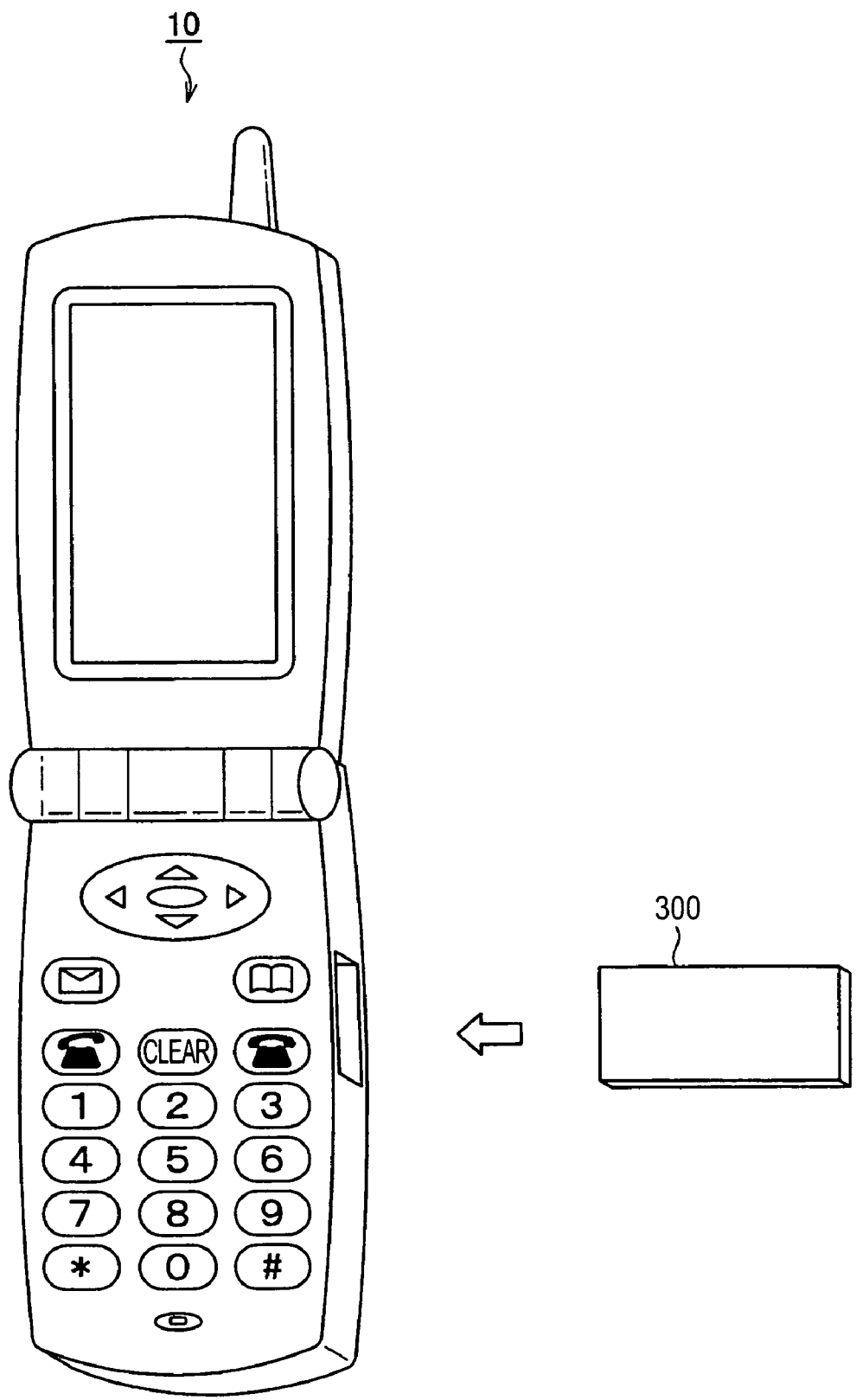
FIG. 1 is schematic view showing the configuration of an NFC-function-equipped mobile radio communication device (a mobile phone) according to a first embodiment.

Preferred embodiments of the present invention will be described below in detail with reference to the accompanying drawings. In the description herein and the drawings, elements having substantially the same configuration are denoted by the same reference numeral and the redundant descriptions are omitted.

First, the configuration of an NFC-function-equipped mobile phone (a mobile radio communication device) according to a first embodiment will be described with reference to FIG. 1. FIG. 1 is a schematic view showing the configuration of an NFC-function-equipped mobile phone (mobile radio communication device) according to a first embodiment. In the present embodiment, a description is given of a case in which a SIM card for a mobile telephone has a SAM card function for NFC communication. The SIM card with the SAM function is detachably attached to an apparatus device main-unit for NFC communication and is hereinafter referred to as a "removable IC card".

First, as shown in FIG. 1, an NFC-function-equipped apparatus 10 according to the present embodiment has a radio module (not shown) equipped with an NFC function (e.g., an NFC radio communication antenna and an NFC circuit). In addition, a removable IC card having a SIM function area and a SAM function area is inserted into and detachably connected to the NFC-function-equipped apparatus according to the present embodiment. Various types of information, such as information for registration with a communication carrier, as well as telephone numbers required as a mobile phone function for the NFC-function-equipped apparatus, are written to the SIM function area of the removable IC card. On the other hand, various types of user information required for the NFC communication of the NFC-equipped apparatus are written to the SAM function area of the removable IC card. Examples of the information include train pass information and electronic money.

With this NFC-function-equipped apparatus, when the mobile-phone function is used, the user information in the SIM function area is transmitted as data, and when the NFC communication function is used, the various types of information in the SAM function area are transmitted. The NFC-function-equipped apparatus (the mobile phone) according to the present embodiment can automatically execute radio communication to exchange data when the apparatus is in close proximity to another NFC-equipped apparatus (e.g., in a near distance in the range of, for example, 10 to 20 cm).

As described below, the removable IC card has a RAM for managing the mode state (e.g., an initial state, authentication state, and communication state) of the SAM function area in the IC card, and can execute communication with another NFC-equipped apparatus, only after the mode state of the IC card is put into the initial state. Thus, turning off or resetting a power supply for the IC-card SAM function area causes the mode of the IC card to be initialized to allow the execution of communication with another NFC-equipped apparatus.

Figure 2:
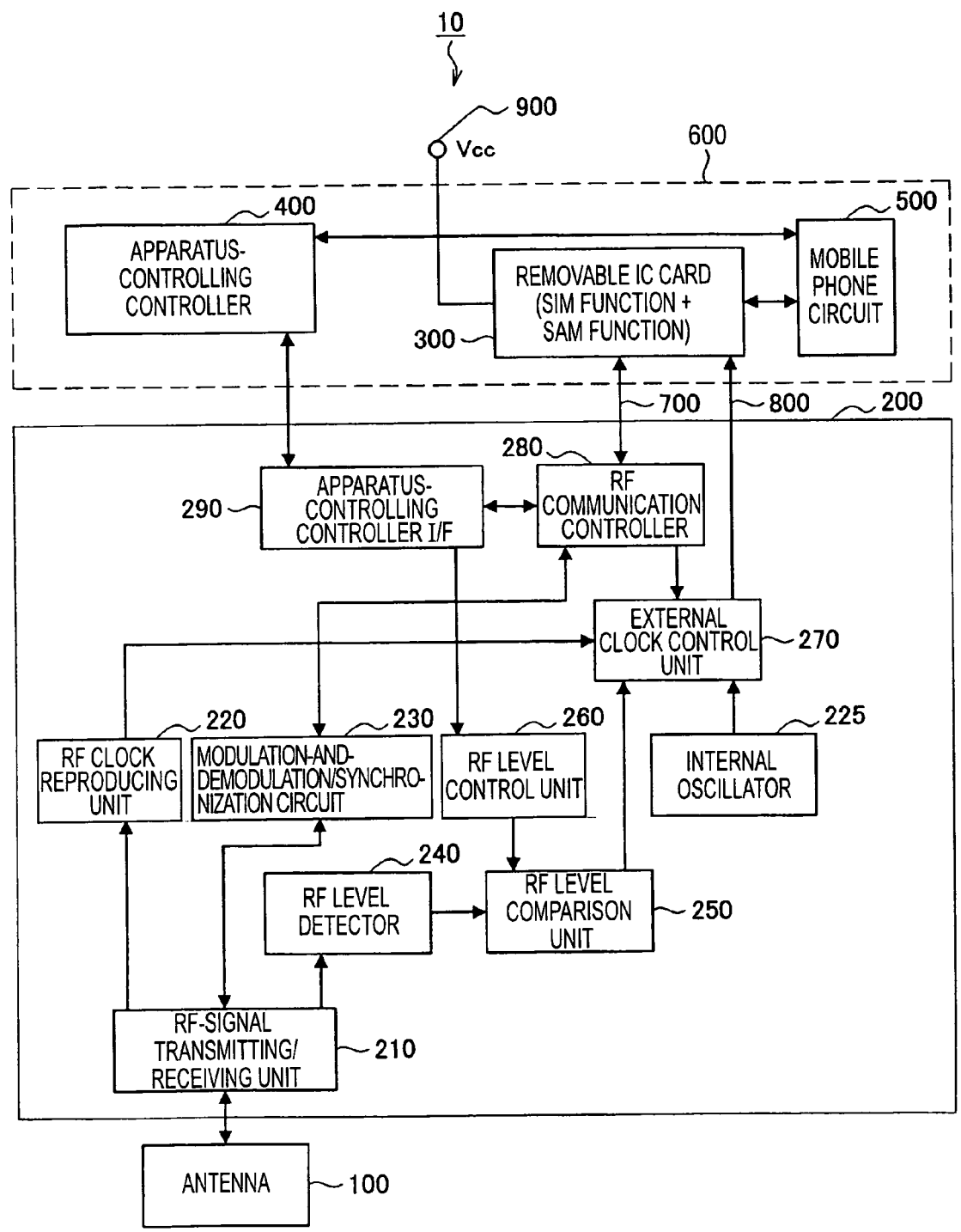
FIG. 2 is a block diagram showing the configuration of the NFC-equipped mobile radio communication device according to the first embodiment.

Next, the circuit configuration of the NFC-equipped mobile radio communication apparatus according to the present embodiment will be described with reference to FIG. 2. FIG. 2 is a block diagram showing the configuration of the NFC-equipped mobile radio communication device according to the present embodiment.

As shown in FIG. 2, the circuit configuration of the NFC-equipped apparatus according to the present embodiment includes an NFC-side circuit, which is constituted by an antenna 100 and an NFC circuit (an NFC chip) 200, and a mobile-phone-side circuit 600, which is constituted by a removable IC card 300, an apparatus-controlling controller 400, and a mobile phone circuit 500. The removable IC card 300 is detachably connected to the NFC circuit 200 in the NFC-equipped apparatus main-unit via a data line 700 and a clock line 800, and receives power supply from a predetermined power source (e.g., a mobile-phone battery) 900. The apparatus-controlling controller 400 and the removable IC card 300 are elements used by both the NFC-side circuit and the mobile-phone-side circuit 600. A description for a circuit for the mobile phone function will be omitted unless otherwise required, since elements of the circuit are not major elements in the NFC-equipped apparatus according to the present embodiment.

As shown in FIG. 2, the antenna 100 is an antenna device for receiving 13.56 MHz frequency-band RF signals (radio signals) transmitted from another NFC-equipped apparatus and for transmitting 13.56 MHz frequency-band RF signals (radio signals) to another NFC-equipped apparatus.

The NFC circuit 200 includes an RF-signal (radio-signal) transmitting/receiving unit 210, an RF-clock reproducing unit 220, a modulation-and-demodulation/synchronization circuit 230, an RF-level detector 240, an RF-level comparison unit (radio-signal strength determining means) 250, an RF level controller (radio-signal strength threshold-value setting means) 260, an external clock control unit 270, an RF communication controller 280, an apparatus-controlling controller I/F (interface) 290, and so on. An internal oscillator 225 can be used as a clock-signal generator.

The RF-signal transmitting/receiving unit 210 is a circuit for extracting basic components from the 13.56 MHz AM-modulated RF signals. The RF-clock reproducing unit 220 reproduces a clock signal from the received 13.56 MHz RF signals to provide a synchronization signal for transmitting data to the removable IC card 300. The internal oscillator 225, such as a crystal oscillator, can also be used for a case other than a case in which a clock signal reproduced from the RF signals by the RF-clock reproducing unit 220 is used. The modulation-and-demodulation/synchronization circuit 230 demodulates the received 13.56 MHz RF signals and extracts, for example, 0 and 1 original signals through synchronized detection.

The RF-level detector 240 is a circuit for converting (averaging) the RF signals, received from the antenna 100 and the RF-signal transmitting/receiving unit 210, into DC-level signals and for outputting the signals to the RF-level comparison unit 250. The RF-level comparison unit 250 is a circuit for comparing an RF-signal-strength threshold value set by the RF-level control unit 260 with a present RF level value sent from the RF-level detector 240 and for outputting a signal indicating which of the values is larger or smaller to the external clock control unit 270. The RF-level comparison unit 250 can be implemented as a comparator. The RF signal strength can be, for example, the voltage value of radio signals.

The external clock generator 270 is a circuit for executing control for the supply or stopping of a clock signal, supplied to the removable IC card 300 via the clock line 800, in accordance with a comparison result sent from the RF-level comparison unit 250. That is, when the present strength of the RF signals received by the antenna 100 and the RF-signal transmitting/receiving unit 210 is higher than an RF level setting value (an RF-signal-strength threshold value), control is executed so as to supply the clock signal to the removable IC card 300. When the present RF signal strength is higher than the RF level setting value (the threshold value), control is executed so as to stop the clock signal supplied to the removable IC card 300.

The RF communication controller 280 controls the communication of data signals, extracted by the modulation-and-demodulation/synchronization circuit 230, with the removable IC card 300 via the data line 700. In response to the comparison result from the RF-level comparison unit 250, the RF communication controller 280 can control data communication with the removable IC card 300 (an internal wire line connected with the RF-level comparison unit 250 is not shown). That is, when the present RF signal strength is higher than the RF level setting value (the threshold value), the RF communication controller 280 executes data communication to or from the IC card. On the other hand, when the present RF signal strength is lower than the RF level setting value (the threshold value), the RF communication controller 280 can perform control so that the data line for the wired card (IC card) is fixed to a high level (or low level).

Based on an instruction sent from the apparatus-controlling controller 400 via the apparatus-controlling controller interface 290, the RF-level control unit 260 sets the RF level setting value (the radio signal strength threshold value) in the RF-level comparison unit 250. The apparatus-controlling controller interface 290 is an interface for executing communication with the apparatus-controlling controller and the NFC circuit.

Unlike known circuits, the NFC circuit (the NFC chip) 200 having the above-described configuration is provided with the RF-level detector 240 and the RF-level comparison unit 250. The NFC circuit 200 compares the RF signals (13.56 MHz), received from another NFC-equipped apparatus via the antenna 100, with the RF-signal setting value (threshold value) set in the RF-level comparison unit to thereby determine the presence/absence of RF signal communication (radio signal communication) with another NFC-equipped apparatus. In addition, when it is determined that the present RF-signal level is lower than the RF-signal setting value (the threshold value), it is regarded that no RF signal is transmitted (or it is regarded that radio communication is finished) and the transmission of the clock signal to the removable IC card 300 is stopped. With this arrangement, the presence/absence of RF signals to/from another NFC-equipped apparatus (i.e., the completion of radio communication) can be determined based on the RF-signal-strength threshold value, the supply of the clock signal can be stopped, and an instruction for mode instruction can be issued to the removable IC card.

The removable IC card 300 has a SAM function area 300' for storing user information regarding the NFC communication function and a SIM function area 300" for storing user information regarding the mobile-phone communication function. The configuration of the removable IC card 300 will be described below in detail.

The apparatus-controlling controller 400 executes control for the entire NFC-equipped apparatus (the NFC communication function and the mobile phone function). In the present embodiment, a function for writing a threshold value, used for determining the presence/absence of RF signals, to the RF level controller.

Figure 3:
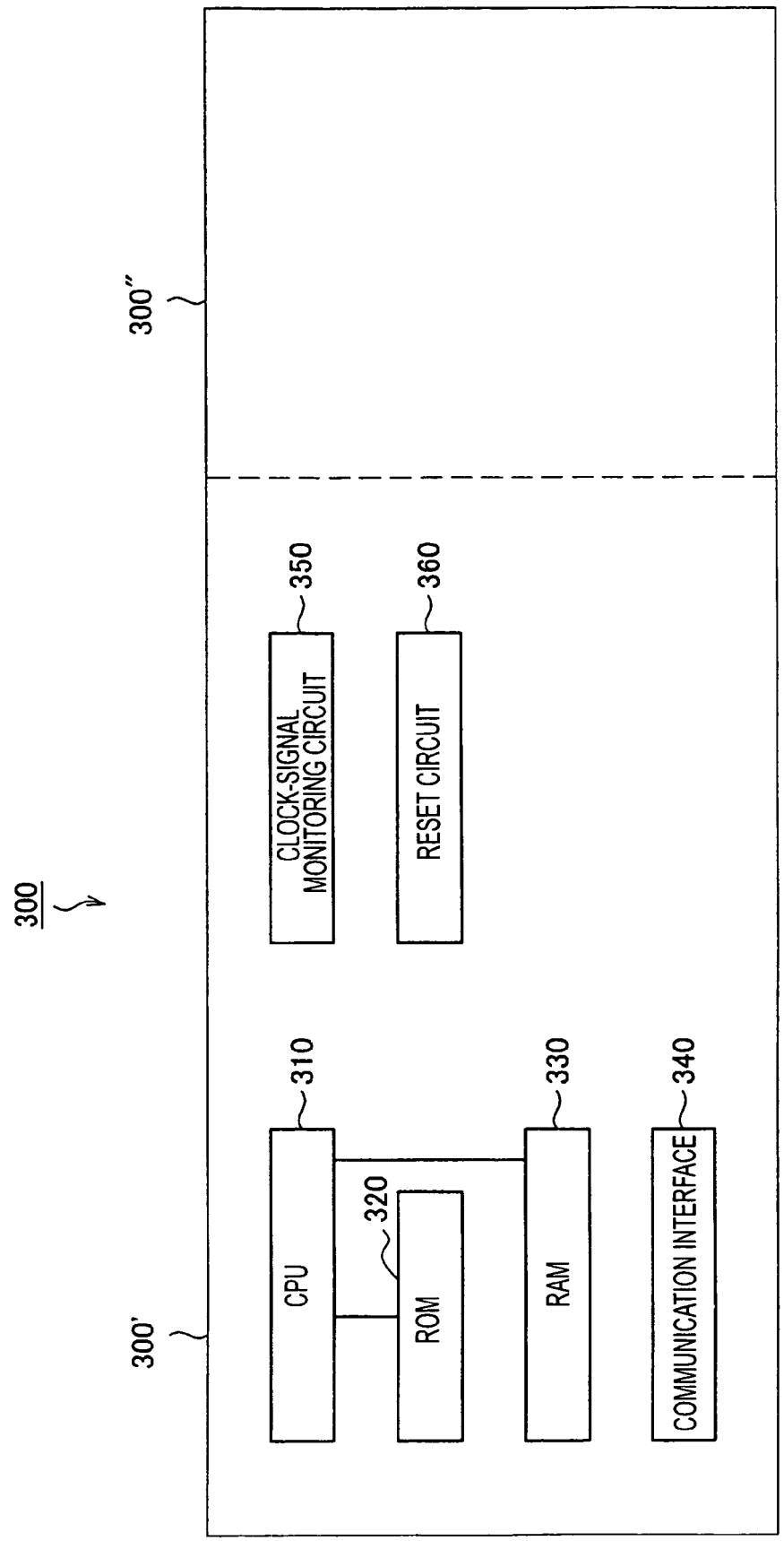
FIG. 3 is a block diagram showing the configuration of a removable IC card 300 according to the first embodiment.

Next, the configuration of the removable IC card according to the present embodiment will be described with reference to FIG. 3. FIG. 3 is a block diagram showing the configuration of the removable IC card according to the present embodiment. The removable IC card according to the present embodiment can be detachably connected to the NFC-equipped apparatus (the mobile radio communication device).

As shown in FIG. 3, the removable IC card according to the present embodiment has a SAM function area 300' for storing user information regarding the NFC communication function and a SIM function area 300" for storing user information regarding the mobile-phone communication function. Since the SIM function area 300" is irrelevant to the removable-IC-card function according to the present embodiment, the description thereof will hereinafter be omitted unless otherwise required.

The SAM function area 300' of the removable IC card 300 according to the present embodiment includes a CPU 310, a ROM (read only memory) 320, a RAM (random access memory) 330, a clock-signal monitoring circuit 350, a reset circuit (an IC card initializing device) 360, and so on.

The CPU 310 controls the entire operation of the card. The ROM (read only memory) 320 is a memory to which the operating system of the card is written. The RAM 330 is a memory that serves as a working memory and a data storing memory. A communication interface 340 executes communication with the NFC circuit 200 via the data line 700 and the clock line 800. The clock-signal monitoring circuit 350 has functions for monitoring the clock signal transmitted from the NFC circuit 200 and for generating a reset signal when the clock signal is stopped. The reset circuit 360 initializes the mode of the SAM function area of the removable IC card, based on the reset signal generated by the clock-signal monitoring circuit 350.

In the removable IC card 300 having the above-described configuration, when the clock-signal monitoring circuit 350 determines that the clock signal from the NFC circuit 200 is stopped, it is regarded that no RF signal is received from another NFC-equipped apparatus (it is regarded that radio communication is finished) and the reset circuit 360 resets the mode of the SAM function area 300' of the removable IC card. Thus, the present removable-IC-card state (e.g., the communication state) written in the RAM 330 is reset to its initial state. With this arrangement, when the NFC-equipped apparatus finishes communication (e.g., when the NFC-equipped apparatus is away from a distance that allows radio communication), the SAM function area of the removable IC card is automatically initialized, so that the removable IC card is automatically put into a state that allows communication with another NFC-equipped apparatus.

Next, a radio communication method for the NFC-equipped apparatus (the mobile radio communication device) according to the present embodiment will be described with reference to FIG. 2. While the description below is given of only a method in which the mobile radio communication device according to the present embodiment receives radio signals from an external radio communication apparatus, the mobile radio communication device according to the present embodiment can also transmit radio signals to an external radio communication apparatus.

First, the apparatus-controlling controller 400 writes an RF-signal-strength threshold value, which determines the presence/absence of RF signals, to the RF-level comparison unit 250 via the apparatus-controlling interface 290 and the RF-level control unit 260. The threshold value can preferably be set in accordance with various radio communication conditions between this device and another external radio communication apparatus.

Figure 4:
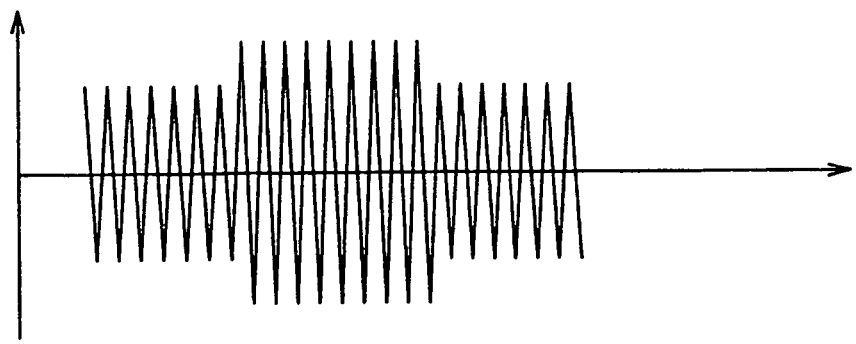
FIG. 4 is a diagram illustrating RF signals received by an antenna and AM-modulated at a frequency of 13.56 MHz.
Figure 5:
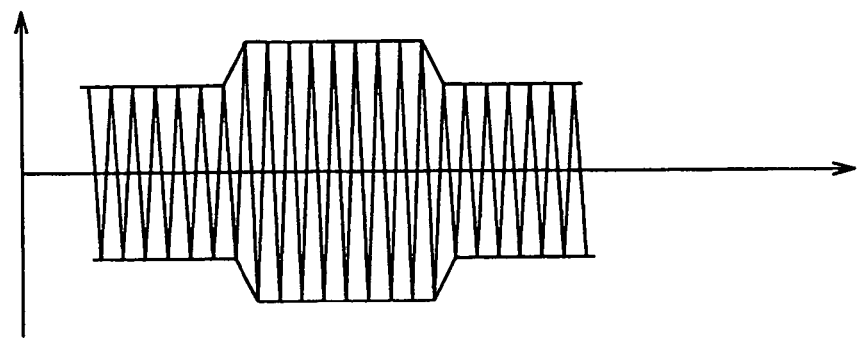
FIG. 5 is a diagram illustrating signals obtained by extracting basic components from the 13.56 MHz AM-modulated RF signals.
Figure 6A:
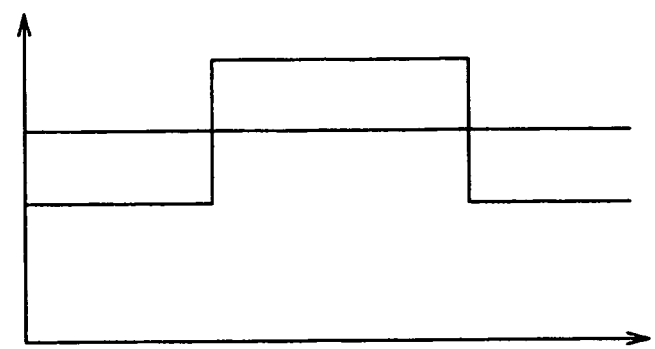
FIGS. 6A and 6B are diagrams each illustrating a state in which the basic components of the RF signals in a level detector is averaged.
Figure 6B:
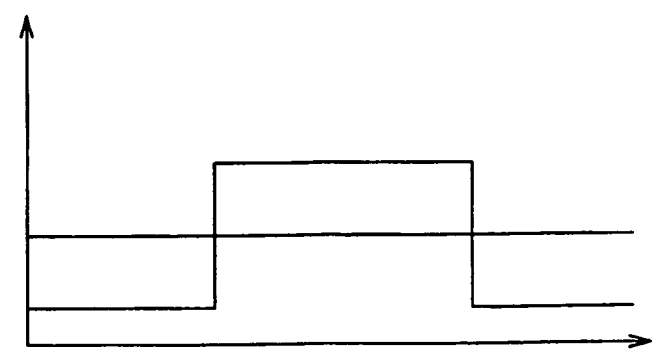

Next, the RF-level detector 240 extracts basic components from the RF signals received via the antenna 100 and the RF-signal transmitting/receiving unit 210 and then converts (averages) the resulting signals into DC-level signals. That is, as shown in FIG. 4, RF signals received by the antenna 100 are AM-modulated signals having a frequency of 13.56 MHz, and as shown in FIG. 5, the RF-level detector 240 extracts basic components from the 13.56 MHz AM-modulated RF signals. The RF-level detector 240 further averages the basic components of the RF signals, as shown in FIGS. 6A and 6B, and the resulting signals are input to the RF-level comparison unit 250. In this case, for example, the voltage value of the RF signals can be used as the strength of the RF signals. FIG. 6A shows a case in which the strength (e.g., the voltage value) of the RF signals is high and FIG. 6B shows a case in which the strength (e.g., the voltage value) of the RF signals is low.

Figure 7:
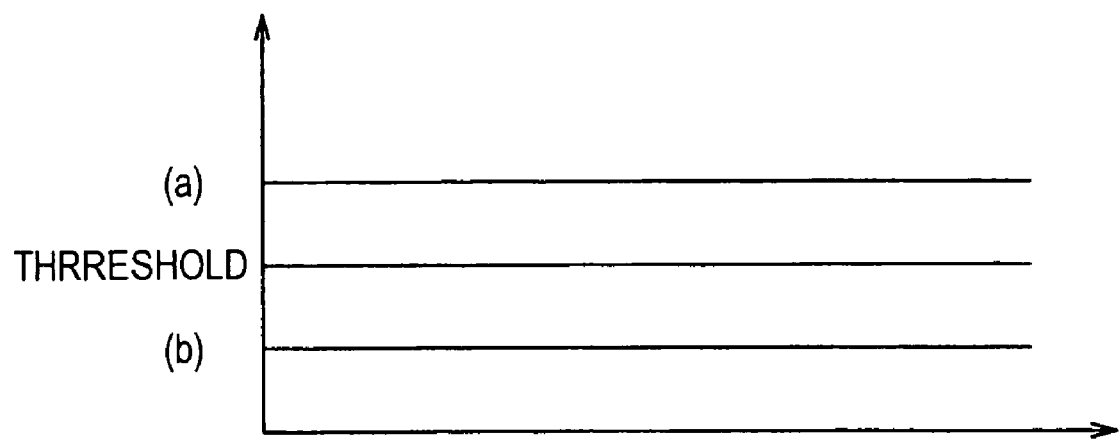
FIG. 7 is a diagram illustrating a state in which the level value of the RF signals in an RF-level comparison unit is compared with a threshold value.

Thereafter, the RF-level comparison unit 250 compares the setting value (the threshold value) sent from the RF-level control unit 260 with the present RF level value sent from the RF-level detector 240 and outputs a signal indicating which of the values is larger or smaller to the external clock control unit 270. As shown in FIG. 7, the RF-level comparison unit 250 compares the RF-signal level value with the threshold value to determine whether or not the level value is higher. In FIG. 7, part (a) indicates that the RF signal level is higher than the threshold value and part (b) indicates that the RF signal level is lower than the threshold value.

Figure 8:
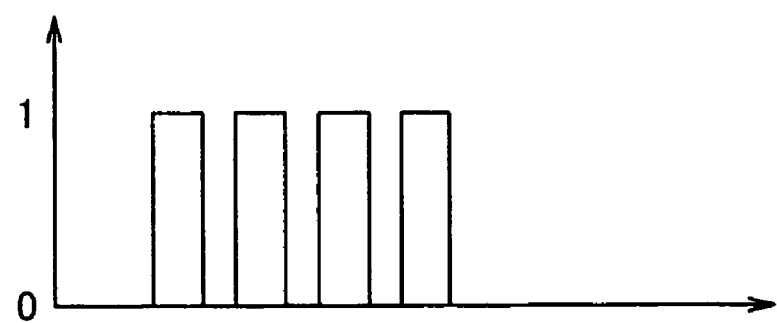
FIG. 8 is a diagram illustrating a clock signal generated by an RF clock circuit.
Figure 9A:
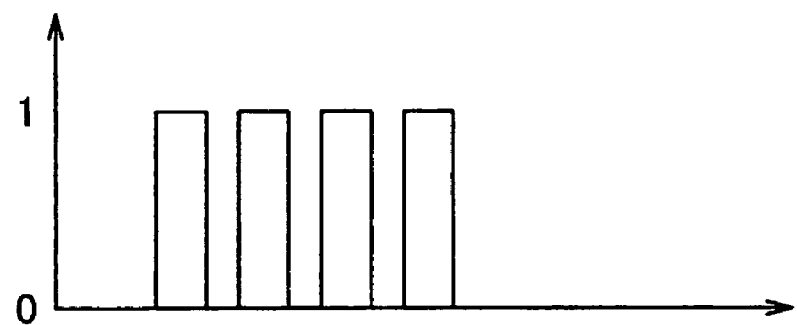
FIG. 9A is a diagram illustrating a state in which the clock signal is supplied to the removable IC card under the control of an external clock control unit.

In addition, in accordance with the result of the comparison of the RF-level comparison unit 250, the external clock control unit 270 stops the clock signal supplied to the removable IC card (the IC card) 300. That is, a clock signal as shown in FIG. 8 is input from the RF-clock reproducing unit 220 to the external clock control unit 270. The clock signal can be supplied from, for example, the internal oscillator 225, such as a crystal oscillator. In the communication state, when the present RF signal strength is greater than the RF-level setting value, the external clock control unit 270 supplies the clock signal to the removable IC card 300, as shown in FIG. 9A.

Figure 9B:
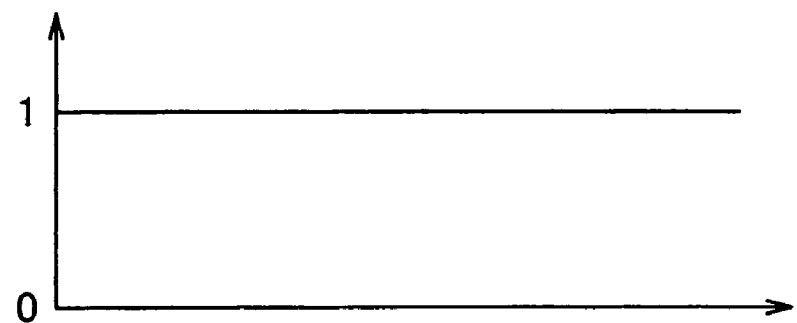
FIG. 9B is a diagram illustrating a state in which the clock signal is supplied in its Hi state to the removable IC card under the control of the external clock control unit.
Figure 9C:
FIG. 9C is a diagram illustrating a state in which the clock signal is supplied in the Lo state to the removable IC card under the control of the external clock control unit.

When the present RF signal strength is lower than the RF-level setting value, the external clock control unit 270 stops the supply of the clock signal to the removable IC card 300 (i.e., the level is fixed to a Hi level or Lo level), as shown in FIGS. 9B and 9C.

In the removable IC card 300, the clock-signal monitoring circuit 350 provided in the removable IC card 300 detects the stopping of the clock signal and generates a reset signal for the reset circuit 360. Based on the reset signal sent from the clock-signal monitoring circuit 350, the reset circuit 360 initializes the mode of the SAM function area of the removable IC card (i.e., resets the mode of the SAM area of the removable IC card to the initial state, the mode being managed by the RAM 330).

Figure 10A:
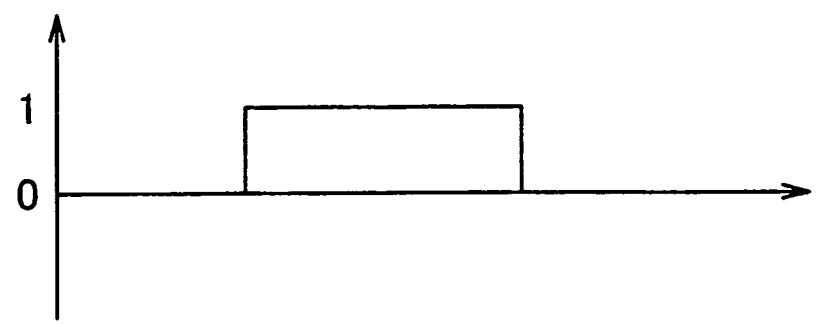
FIG. 10A is a diagram illustrating the state of data signals input to the removable IC card via a data line under the control of an RF communication controller.
Figure 10B:
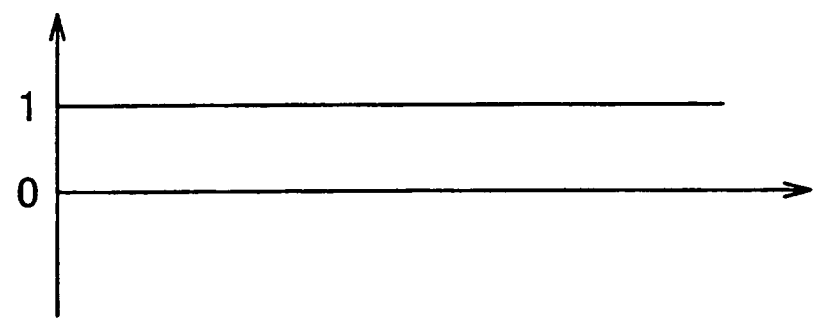
FIG. 10B is a diagram illustrating a state in which the data signals are supplied in its Hi state to the removable IC card via the data line under the control of the RF communication controller.
Figure 10C:
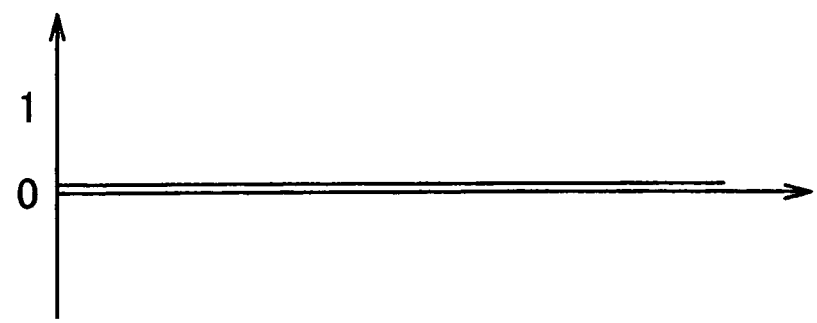
FIG. 10C is a diagram illustrating a state in which the data signals are supplied in the Lo state to the removable IC card via the data line under the control of the RF communication controller.

On the other hand, the RF signals input to the RF-signal transmitting/receiving unit 210 are further input to the modulation-and-demodulation/synchronization circuit 230 and are demodulated. That is, 0 and 1 original signals are extracted through synchronized detection, so that data signals are formed as shown in FIGS. 10A to 10C. Under the control of the RF communication controller 280, the data signals are input to the removable IC card 300 via the data line 700.

In this case, inputting the signal of the RF-level comparison unit 250 to the RF communication controller 280 allows the data communication with the removable IC card to be stopped in accordance with the level of the RF signals (an internal wire line between the RF communication controller 280 and the RF-level comparison unit 250 is not shown). That is, when the present RF signal strength is higher than the RF-level setting value (the threshold value), data communication with the removable IC card 300 is executed as shown in FIG. 10A. On the other hand, when the present RF signal strength is lower than the RF-level setting value, the level of the data line to the removable IC card 300 is fixed to the Hi level (see FIG. 10B) or the Low level (see FIG. 10C). As a result, for example, data generated by noise or the like is prevented from being transmitted to the removable IC card 300.

In the present embodiment, for example, even when one removable IC card in which a SIM card and a SAM card are integrated is inserted, the mode state of the SAM function area can be automatically initialized without turning off power for the SIM function area, after radio communication (NFC communication) with another NFC-equipped apparatus is executed. With this arrangement, after the completion of NFC radio communication, the mobile radio communication device can be automatically put into a state that allows radio communication with another NFC-equipped apparatus. In addition, it is possible to maintain compatibility with currently-available contactless IC card systems. Additionally, since the SAM function area of the removable IC card can be reset using a line through which general data communication is performed, it is possible to easily manufacture mobile radio communication devices at low cost.

Second Embodiment

Figure 11:
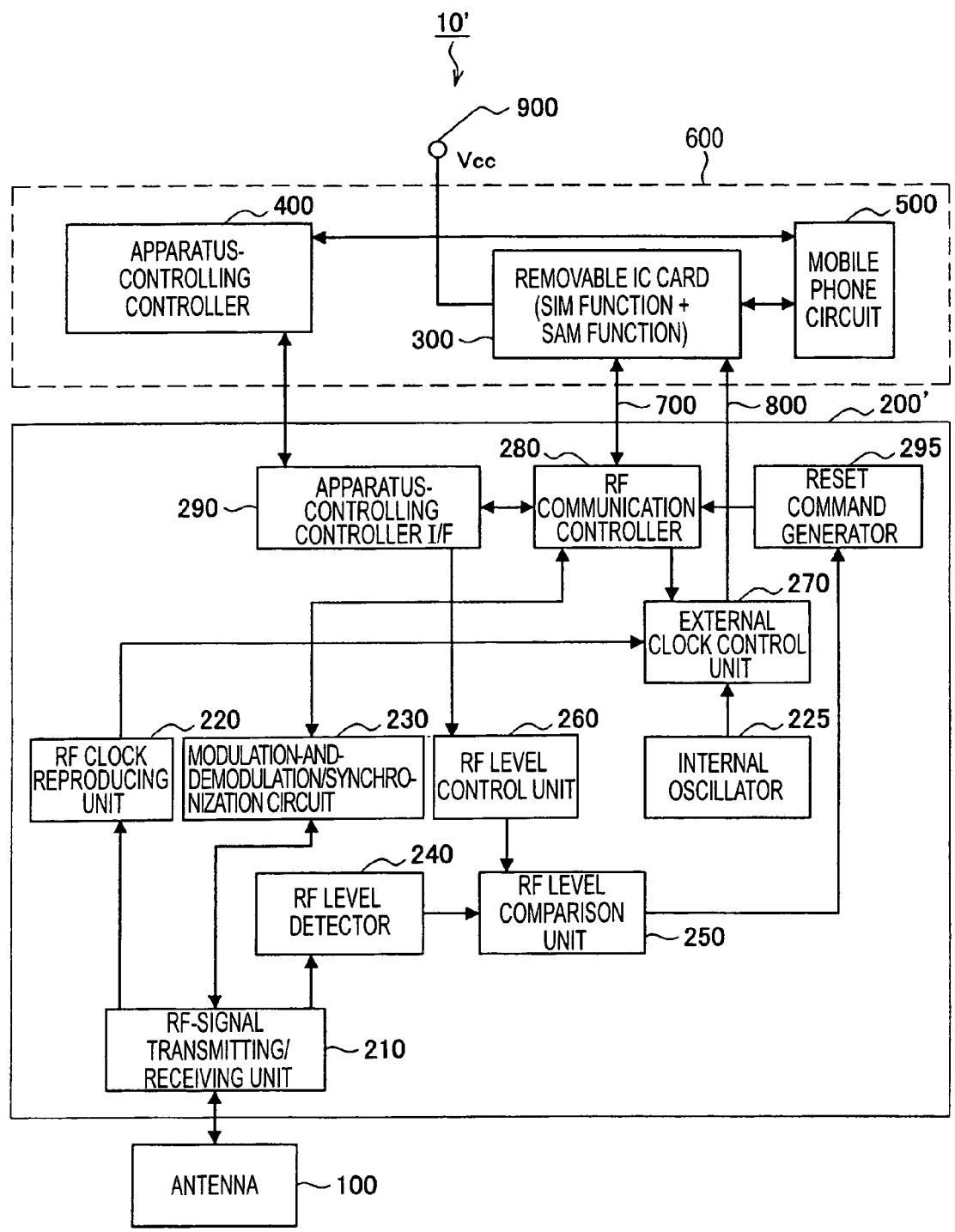
FIG. 11 is a block diagram showing the configuration of an NFC-equipped mobile radio communication device according to a second embodiment.

Next, the configuration of an NFC-equipped mobile radio communication device according to a second embodiment will be described with reference to FIG. 11. FIG. 11 is a block diagram showing the configuration of an NFC-equipped mobile radio communication device according to a second embodiment. In the NFC-equipped mobile radio communication device according to the present embodiment, the NFC chip has a reset command generator 295, unlike the first embodiment. When the RF-level comparison unit 250 determines that the RF signal strength is lower than a preset threshold value, the reset command generator 295 transmits a reset command to a removable IC card 300.

As shown in FIG. 11, the mobile radio communication device 10' according to the present embodiment includes an NFC-side circuit, which is constituted by an antenna unit 100, an NFC circuit unit (an NFC chip) 200', the IC card 300, an apparatus-controlling controller 400, and so son, and a mobile-phone-side circuit 600, which is constituted by a removable IC card 300, an apparatus-controlling controller 400, and a mobile-phone-side circuit 500. The removable IC card 300 is detachably connected to the NFC circuit 200' in the NFC-equipped apparatus main-unit via a data line 700 and a clock line 800, and receives power supply from a predetermined power source (e.g., a mobile-phone battery) 900. Since the antenna 100, the removable IC card 300, the apparatus-controlling controller 400, and the mobile-phone-side circuit 500 in the mobile radio communication device 10' according to the present embodiment have similar configurations to those in the first embodiment, the descriptions thereof are omitted.

The NFC circuit (the NFC chip) 200' according to the present embodiment includes an RF-signal transmitting/receiving unit 210, an RF-clock reproducing unit 220, a modulation-and-demodulation/synchronization circuit 230, an RF-level detector 240, an RF-level comparison unit 250, an RF-level control unit 260, an external clock control unit 270, an RF communication controller 280, an apparatus-controlling controller I/F (interface) 290, the reset command generator 295, and so on. An internal oscillator 225 can also be used as a clock-signal generator. Since the RF-signal transmitting/receiving unit 210, the RF-clock reproducing unit 220, the modulation-and-demodulation/synchronization circuit 230, the RF-level detector 240, the RF-level comparison unit 250, the RF-level control unit 260, the external clock control unit 270, and the apparatus-controlling controller I/F (interface) 290 in the NFC circuit (the NFC chip) 200' according to the present embodiment are analogous to those in the first embodiment, the descriptions thereof will be omitted.

The reset command generator 295 according to the present embodiment generates a reset signal for the RF communication controller 280, in response to a signal sent from the RF-level comparison unit 250. The RF communication controller 280 transmits the reset signal to the removable IC card 300 to give an instruction for mode initialization. That is, when the present level of the RF signals received by the antenna 100 and the RF-signal transmitting/receiving unit 210 is lower than the RF level setting value (the threshold value), the RF communication controller 280 transmits the reset signal to the removable IC card 300 to give an instruction for initialization execution to the removable IC card.

In the present embodiment, for example, even when one removable IC card in which a SIM card and a SAM card are integrated is inserted, the mode state of the SAM function area can be automatically initialized without turning off power to the SIM function area, after radio communication (NFC communication) with another NFC-equipped device is executed. With this arrangement, after the completion of NFC communication, the mobile radio communication device can be automatically put into a state that allows NFC radio communication with another NFC-equipped apparatus. In addition, it is possible to maintain compatibility with currently-available contactless IC card systems. Additionally, since the SAM function area of the removable IC card can be reset using a line through which general data communication is performed, it is possible to easily manufacture mobile radio communication devices at low cost.

Third Embodiment

Figure 12:
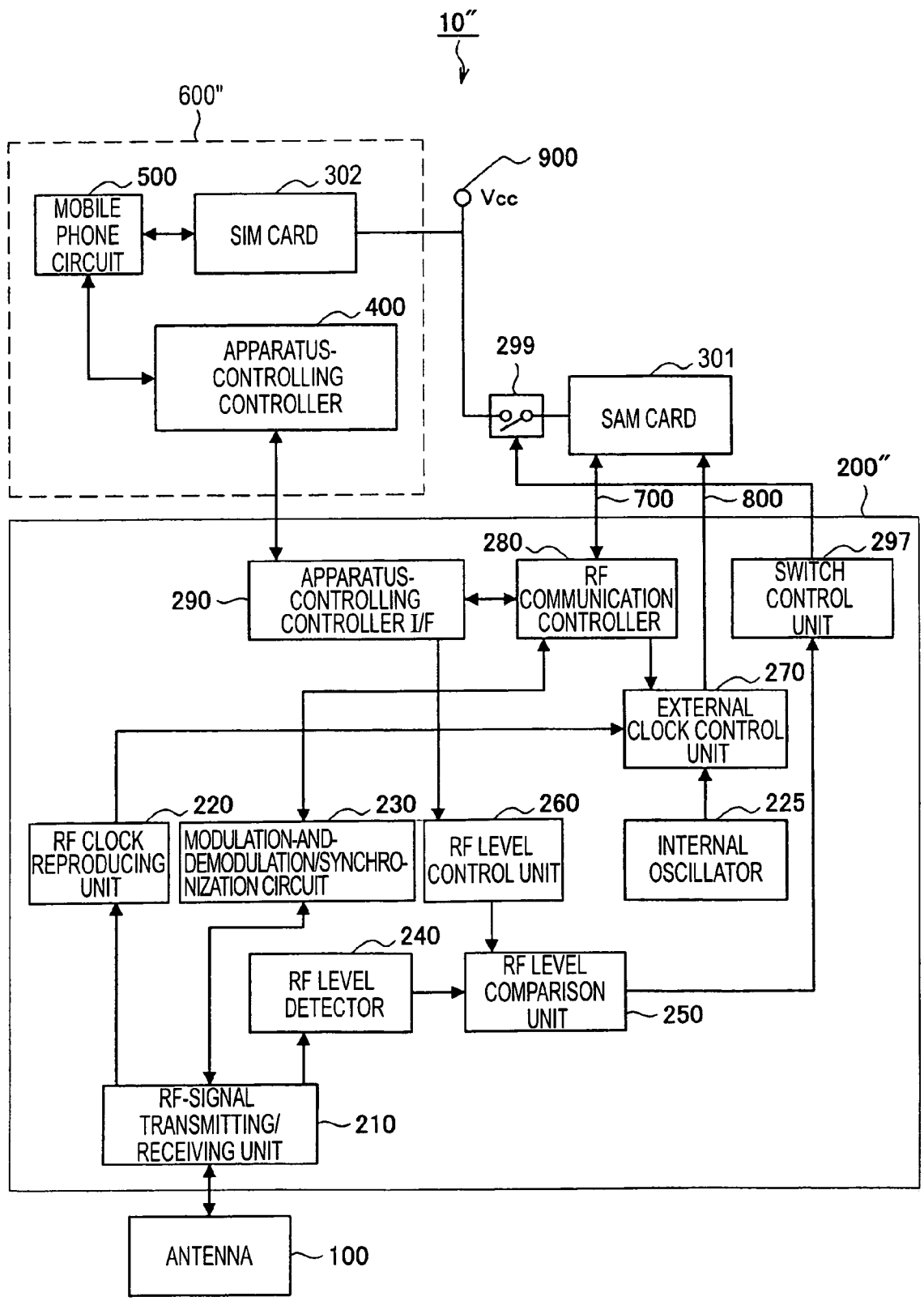
FIG. 12 is a block diagram showing the configuration of an NFC-equipped mobile radio communication device according to a third embodiment.

Next, the configuration of an NFC-equipped mobile radio communication device according to a third embodiment will be described with reference to FIG. 12. FIG. 12 is a block diagram showing the configuration of an NFC-equipped mobile radio communication device according to a third embodiment.

In the NFC-equipped mobile radio communication device according to the present embodiment, the removable IC card 300 is provided as separate cards, i.e., a SIM card and a SAM card, unlike the first and second embodiments. The NFC-equipped mobile radio communication device has a configuration for turning off power supply for the SAM card, when the RF-level comparison unit determines that the RF signal strength is lower than a preset threshold value.

As shown in FIG. 11, the mobile radio communication device 10' according to the present embodiment includes an NFC-side circuit, which is constituted by an antenna 100 and an NFC circuit unit (an NFC chip) 200'', and a mobile-phone-side circuit 600'', which is constituted by a SAM card 301 (corresponding to the SAM function area of the removable IC card 300), a SIM card 302 (corresponding to the SIM function area of the removable IC card 300), an apparatus-controlling controller 400, and a mobile phone circuit 500. The SAM card 301 and the SIM card 302 are detachably attached to the NFC-equipped apparatus main-unit. The SAM card 301 is also connected to the NFC circuit unit 200'' via a data line 700 and a clock line 800. A switch 299 that can stop power supplied to the SAM card 301 is provided between a predetermined power source (e.g., a mobile-phone battery) 900 and the SAM card 301.

Since the antenna 100, the apparatus-controlling controller 400, and the mobile-phone-side circuit 500 in the mobile radio communication device 10'' according to the present embodiment have similar configurations to those in the first embodiment, the descriptions thereof are omitted.

The NFC circuit unit (the NFC chip) 200'' according to the present embodiment includes an RF-signal transmitting/receiving unit 210, an RF-clock reproducing unit 220, a modulation-and-demodulation/synchronization circuit 230, an RF-level detector 240, an RF-level comparison unit 250, an RF-level control unit 260, an external clock control unit 270, an RF communication controller 280, an apparatus-controlling controller I/F (interface) 290, a switch control unit 297, and so on. An internal oscillator 225 can also be used as a clock-signal generator. Since the RF-signal transmitting/receiving unit 210, the RF-clock reproducing unit 220, the modulation-and-demodulation/synchronization circuit 230, the RF-level detector 240, the RF-level comparison unit 250, the RF-level control unit 260, the external clock control unit 270, and the apparatus-controlling controller I/F (interface) 290 in the NFC circuit unit (the NFC chip) 200'' according to the present embodiment are similar to those in the first embodiment, the descriptions thereof will be omitted.

The switch control unit 297 according to the present embodiment controls the switch 299 in accordance with a signal sent from the RF-level comparison unit 250. That is, when the present level of the RF signals received by the antenna 100 and the RF-signal transmitting/receiving unit 210 is lower than the RF level setting value (the threshold value), the switch control unit 297 turns off the switch 299 to stop power supply for the SAM card 301, so that the initialization of the mode of the SAM card 301 is executed.

In the present embodiment, for example, even when the SIM card and the SAM card are provided as separate IC cards, the mode state of the SAM card can be automatically initialized without turning off power supply for the SIM card, after radio communication (NFC communication) with another NFC-equipped apparatus is executed. With this arrangement, after the communication of the mobile radio communication device is finished, it can be automatically put into a state that allows communication with another NFC-equipped apparatus. In addition, it is possible to maintain compatibility with currently-available contactless IC card systems.

Preferred embodiments of the present invention have been described above with reference to the accompanying drawings. However, needless to say, the present embodiment is not limited to such examples. It is apparent to those skilled in the art that various changes and modifications can be conceived within the scope disclosed in the claims and it is to be naturally understood that those changes and modifications belong to the technical scope of the present invention.

For example, although examples of a mobile phone have been described as a terminal device equipped with the NFC function, the present invention is not limited thereto. For example, the present invention can be implemented even when the device is incorporated into a digital camera, PDA, personal computer, game machine, computer peripheral apparatus, and so on.

Although examples of a SIM card have been described in the above embodiments, the present invention is not limited thereto. For example, the present invention is also applicable to USIM (universal subscriber identify module) cards and flash memory cards.

Although examples in which a common power source is used for the SIM card (the SIM function area) and the SAM card (the SAM function area) have been described in the above-described embodiments, the present invention is not limited thereto. Power sources for the SIM card (the SIM function area) and the SAM card (the SAM function area) may be separately provided.

Although an example in which one removable IC card in which the SIM card and the SAM card are integrated has been described in the first and second embodiments, the present invention is not limited thereto. For example, the SIM card and SAM card can also be incorporated, as separate cards, into the mobile radio communication device.

Although an example in which the RAM in the IC card manages the mode state has been described in the above embodiments, the present invention is not limited thereto. For example a state machine for the IC card can be provided. In this case, the reset circuit initializes the state machine.

Only the radio communication method for receiving RF signals has been described in the above-described embodiments, the device can be configured so as to transmit RF signals in accordance with the RF signal strength.

INDUSTRIAL APPLICABILITY

The present invention is applicable to mobile radio communication devices, particularly, to NFC-function-equipped mobile radio communication devices.

The invention claimed is:

1. A mobile radio communication device for transmitting/receiving data to/from an external radio communication apparatus located in an area that allows radio communication, the mobile radio communication device including:
   a radio-signal transmitting/receiving unit for performing radio communication with the external radio communication apparatus;
   a connection unit detachably connected to an IC card that receives power supply from the mobile radio communication device, that manages data transmitted/received to/from the external radio communication apparatus, and that manages a communication mode state of the mobile radio communication device;
   radio-signal strength determining means for determining whether or not a strength of radio signals received from the external radio communication apparatus is less than or equal to a preset threshold value; and
   IC-card-mode initializing means for resetting a mode of the IC card to an initial state when the radio-signal strength determining means determines that the strength of the received radio signals is less than or equal to the threshold value.

2. The mobile radio communication device according to claim 1, further including radio strength threshold-value setting means for setting the threshold value in accordance with a predetermined condition.

3. The mobile radio communication device according to claim 1, further including data transmission stopping means for stopping transmission of data to the IC card when the radio-signal strength determining means determines that the strength of the received radio signals is less than or equal to the threshold value.

4. The mobile radio communication device according to claim 1, wherein the mobile radio communication device is incorporated in a mobile phone terminal and the transmitting/receiving unit is connected to an antenna built into the mobile phone terminal.

5. The mobile radio communication device according to claim 4, wherein the IC card is integrated with a SIM card detachably connected with the mobile telephone terminal and is provided.

6. A mobile radio communication device for transmitting/receiving data to/from an external radio communication apparatus located in an area that allows radio communication, the mobile radio communication device including:
   a radio-signal transmitting/receiving unit for performing radio communication with the external radio communication apparatus;
   a connection unit detachably connected to an IC card that receives power supply from the mobile radio communication device, that manages data transmitted/received to/from the external radio communication apparatus, and that manages a communication mode state of the mobile radio communication device;
   radio-signal strength determining means for determining whether or not a strength of radio signals received from the external radio communication apparatus is less than or equal to a preset threshold value; and
   clock-signal controlling means for stopping supply of a clock signal to the IC card when the radio-signal strength determining means determines that the strength of the received radio signals is less than or equal to the threshold value, wherein the IC card comprises mode initializing means for putting a mode of the IC card into an initial state when the supply of the clock signal is stopped.

7. The mobile radio communication device according to claim 6, further including radio strength threshold-value setting means for setting the threshold value in accordance with a predetermined condition.

8. The mobile radio communication device according to claim 6, further including data transmission stopping means for stopping transmission of data to the IC card when the radio-signal strength determining means determines that the strength of the received radio signals is less than or equal to the threshold value.

9. The mobile radio communication device according to claim 6, wherein the mobile radio communication device is incorporated in a mobile phone terminal and the transmitting/receiving unit is connected to an antenna built into the mobile phone terminal.

10. The mobile radio communication device according to claim 9, wherein the IC card is integrated with a SIM card detachably connected with the mobile telephone terminal and is provided.

11. A mobile radio communication device for transmitting/receiving data to/from an external radio communication apparatus located in an area that allows radio communication, the mobile radio communication device including:
- a radio-signal transmitting/receiving unit for performing radio communication with the external radio communication apparatus;
- a connection unit detachably connected to an IC card that receives power supply from the mobile radio communication device, that manages data transmitted/received to/from the external radio communication apparatus, and that manages a communication mode state of the mobile radio communication device;
- radio-signal strength determining means for determining whether or not a strength of radio signals received from the external radio communication apparatus is less than or equal to a preset threshold value; and
- reset-signal generating means for transmitting a reset signal to the IC card when the radio-signal strength determining means determines that the strength of the received radio signals is less than or equal to the threshold value, wherein the IC card includes mode initializing means for resetting a mode of the IC card to an initial state upon receiving the reset signal.

12. The mobile radio communication device according to claim 11, further including radio strength threshold-value setting means for setting the threshold value in accordance with a predetermined condition.

13. The mobile radio communication device according to claim 11, further including data transmission stopping means for stopping transmission of data to the IC card when the radio-signal strength determining means determines that the strength of the received radio signals is less than or equal to the threshold value.

14. The mobile radio communication device according to claim 11, wherein the mobile radio communication device is incorporated in a mobile phone terminal and the transmitting/receiving unit is connected to an antenna built into the mobile phone terminal.

15. The mobile radio communication device according to claim 14, wherein the IC card is integrated with a SIM card detachably connected with the mobile telephone terminal and is provided.

16. A mobile radio communication device for transmitting/receiving data to/from an external radio communication apparatus located in an area that allows radio communication, the mobile radio communication device comprising:
- a radio-signal transmitting/receiving unit for performing radio communication with the external radio communication apparatus;
- a connection unit detachably connected to an IC card that receives power supply from the mobile radio communication device, that manages data transmitted/received to/from the external radio communication apparatus, and that manages a communication mode state of the mobile radio communication device;
- radio-signal strength determining means for determining whether or not a strength of radio signals received from the external radio communication apparatus is less than or equal to a preset threshold value;
- power-supply stop instructing means for giving an instruction for stopping power supply to the IC card when the radio-signal strength determining means determines that the strength of the received radio signals is less than or equal to the threshold value; and
- power-supply stopping means for stopping the power supply from a power source to the IC card in accordance with the instruction given from the power-supply stop instructing means.

17. The mobile radio communication device according to claim 16, further comprising radio strength threshold-value setting means for setting the threshold value so as to correspond to a predetermined condition.

18. The mobile radio communication device according to claim 16, further comprising data transmission stopping means for stopping the transmission of data to the IC card when the radio-signal strength determining means determines that the strength of the received radio signals is less than or equal to the threshold value.

19. The mobile radio communication device according to claim 16, wherein the mobile radio communication device is incorporated into a mobile phone terminal and the IC card is provided separately from a SIM card that is detachably connected to the mobile phone terminal.

* * * * *